United States Patent [19]
Tomisawa et al.

[11] Patent Number: 4,910,448
[45] Date of Patent: Mar. 20, 1990

[54] PWM CIRCUIT

[75] Inventors: Norio Tomisawa; Mamoru Horino, both of Hamamatsu, Japan

[73] Assignee: Yamaha Corporation, Hamamatsu, Japan

[21] Appl. No.: 239,132

[22] Filed: Aug. 31, 1988

[30] Foreign Application Priority Data

Sep. 7, 1987 [JP] Japan .................... 62-223790

[51] Int. Cl.$^4$ .............................. G05B 11/28
[52] U.S. Cl. ........................ 318/599; 363/41; 388/804; 388/811; 318/254
[58] Field of Search ........... 318/599, 341, 314, 318; 363/41

[56] References Cited

U.S. PATENT DOCUMENTS 4,243,921  1/1981  Tamura et al. ............... 318/314
4,249,119  2/1981  Robbi ............................ 318/341
4,500,822  2/1985  Tajima et al. ................. 318/314

Primary Examiner—William M. Shoop, Jr.
Assistant Examiner—Saul M. Bergmann
Attorney, Agent, or Firm—Spensley Horn Jubas & Lubitz

[57] ABSTRACT

A PWM circuit for generating a PWM wave which is pulse-width modulated in response to binary information and is used for a signal such as a motor driving signal in an R-DAT (rotary head type digital audio tape recorder) comprises a circuit for dividing binary information such as a motor speed error signal provided for generating a PWM wave into plural bit groups and generates PWM waves corresponding to numerical values of these plural bit groups, and a circuit for weighting the generated PWM waves in an analog manner at a ratio corresponding to orders of the respective bit groups and adding the weighted PWM waves. Since binary information is divided into plural bit groups, the bit number of each bit group is small so that the period of PWM wave can be shortened without reducing the quantization bit number of the binary information or shortening reference clock period whereby accuracy of an error signal can be improved when the invention is applied to, e.g., a motor drive device.

5 Claims, 3 Drawing Sheets

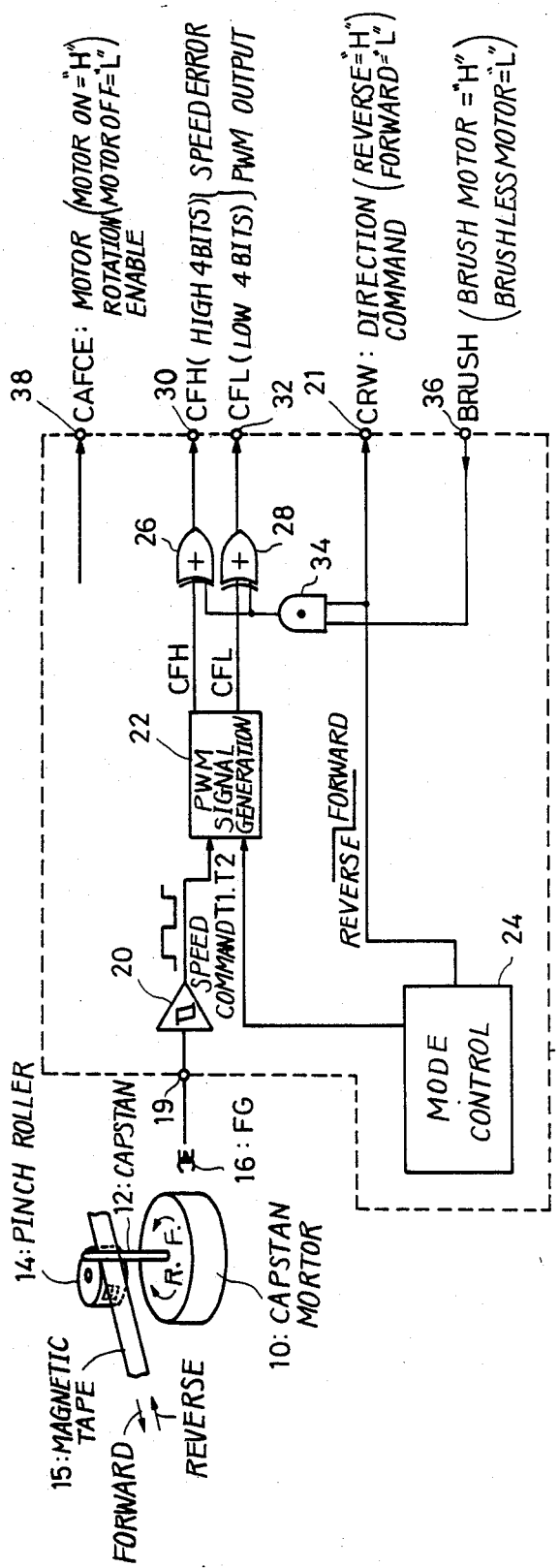
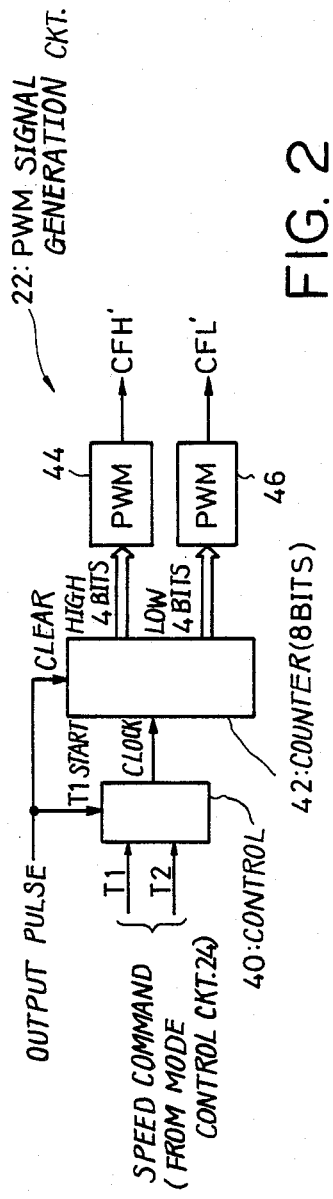
FIG. 1
FIG. 2

PWM CIRCUIT

BACKGROUND OF THE INVENTION

This invention relates to a circuit for generating a PWM wave used for a signal such as a motor driving signal in an R-DAT (rotary head type digital audio tape recorder) and, more particularly, to a circuit of this type capable of shortening a period of a PWM wave without reducing quantization bit number of binary information for producing the PWM wave or shortening a period of a reference clock for the PWM wave.

In an R-DAT, various motors are provided including a drum motor for driving a rotary drum, a capstan motor for driving a capstan and a reel motor for driving a reel support. For these motors, DC motors such as brush motors and brushless motors are used and these motors are controlled in their rotation speed (or rotation speed and rotational phase) through a servo loop.

As a method for controlling the rotation speed of these motors, there is a method using a PWM wave as a drive signal. According to this method, a period of a reference signal is compared with a period of a motor rotation speed detection signal detected from an FG (frequency generator) or a phase of a rotational phase detection signal detected from a PG (phase generator) and duty ratio of a PWM wave is changed in accordance with an error between the two signals (i.e., the duty ratio is increased if the detected speed or phase is slower than a regular speed or phase whereas it is decreased if the detected speed or phase is faster than the regular speed or phase) and the thus adjusted PWM wave is applied to the motor. If the period of the PWM wave is sufficiently short, the motor is driven by an average voltage of the PWM wave so that the speed of the motor increases as the duty ratio increases and it decreases as the duty ratio decreases whereby the speed of the motor is controlled to a predetermined speed.

In a case where binary information is used as information for determining the duty ratio of PWM wave (i.e., error signal in the above described case), a PWM wave is produced in the prior art method by generating, at a certain period, a signal which sustains a state "1" during a period of time corresponding to the value of the binary information (more exactly, period of time which is [value of the binary information]×[period of reference clock for generating the PWM wave]).

In the prior art method in which a PWM wave which sustains a state "1" during a period of time corresponding to the value of the binary information is produced, a period of PWM wave corresponding to the value of full bits of the binary information is required and, accordingly, the period of the PWM wave becomes longer as the quantization bit number of the binary information increases. If, for example, the quantization bit number of information for determining the duty ratio of the PWM wave is 8 bits, a PWM period of $2^8 \times$[reference clock period] is required.

In a servo loop of the rotation speed or rotational phase of a motor driven by the PWM wave, the period of an error output is longer than the period of the PWM wave due to capacities of the FG and PG so that the PWM wave is generated several times with the same pattern of duty ratio during a period of time from generation of one error output till generation of next error output. When a new error output has been generated, different data (i.e., data corresponding to the preceding error output) is produced for a period corresponding to one period of PWM wave at the maximum before the new error output is provided after being pulse-width modulated. Besides, since the period of the error output and the PWM period are not synchronized with each other, the period of time during which a PWM wave based on different data is produced is not constant but varies each time. If the PWM period is shorter than the error output period to the extend that it can be neglected, there will be substantially no problem. If, however, the PWM period is not sufficiently shorter than the error output period, the error output becomes inaccurate.

For shortening the period of the PWM wave, it is conceivable to reduce the quantization bit number of information for generating the PWM wave or to shorten the reference clock period. The former method, however, is disadvantageous in that the information such as error signal obtained will become less accurate with a result that accurate control of speed or phase cannot be expected. The latter method has a limit in shortening the period of reference clock.

It is, therefore, an object of the invention to provide a PWM circuit capable of shortening the period of a PWM wave without reducing the quantization bit number of binary information for generating the PWM wave or shortening the reference clock period and thereby improving accuracy of an error signal when the circuit is applied to, e.g., a motor drive device.

SUMMARY OF THE INVENTION

For achieving the above described object, the PWM circuit for generating a PWM wave which is pulse-width modulated in response to binary information comprises means for dividing binary information provided for generating a PWM wave into plural bit groups and generating PWM waves corresponding to numerical values of these plural bit groups, and means for weighting the generated PWM waves in an analog manner at a ratio corresponding to orders of the respective bit groups and adding the weighted PWM waves.

According to the invention, binary information for generating a PWM wave is divided into plural bit groups and PWM signals corresponding to values of the respective bit groups are produced. These PWM signals are then weighted in an analog manner at a ratio corresponding to orders of the respective bit groups and added together for being provided as a speed control signal. When viewed at an average level, the PWM signal obtained in the foregoing manner is the same as the PWM signal obtained in the prior art method by utilizing binary information directly without dividing it and can be used for a servo loop of speed or phase in the same manner as the prior art PWM wave. Since binary information is divided into plural bit groups for generating PWM signals, the bit number of each bit group is small so that the period of the PWM wave can be shortened without reducing the quantization bit number of binary information for generating the PWM wave or shortening the reference clock period whereby accuracy of an error signal can be improved when the invention is applied to, e.g., a motor drive device.

A preferred embodiment of the invention will be described with reference to the accompanying drawings.

BRIEF DESCRIPTION OF THE DRAWINGS

In the accompanying drawings,

FIG. 1 is a block diagram showing an embodiment of the invention applied to an R-DAT;

FIG. 2 is a block diagram showing a specific example of a PWM circuit 22 in FIG. 1;

DESCRIPTION OF A PREFERRED EMBODIMENT

Figure 3:
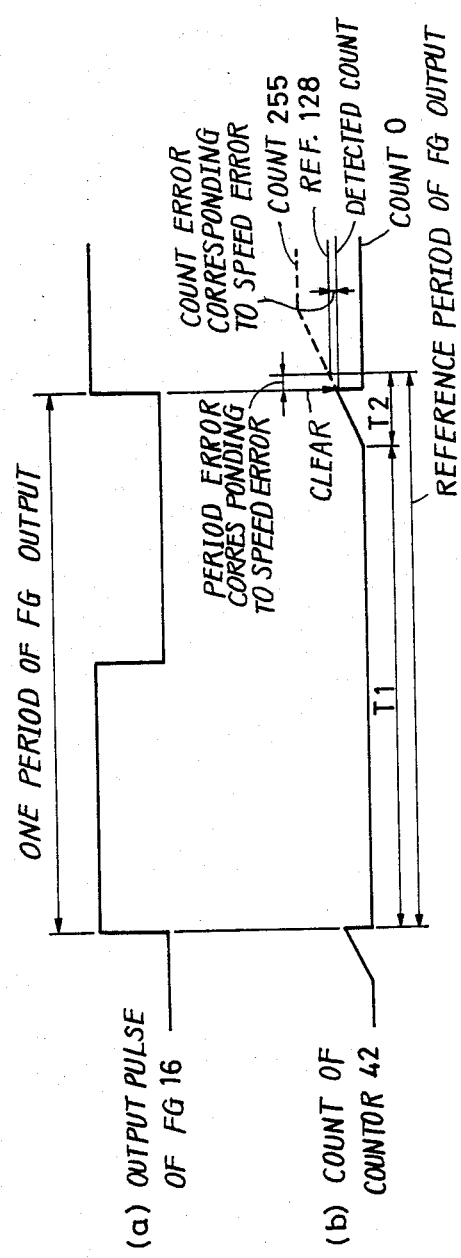
FIG. 3 is a diagram showing a speed error detection operation by a counter 42 in FIG. 2.

FIG. 1 shows an embodiment in which this invention is applied to driving of a capstan motor of an R-DAT.

In a capstan motor 10, a motor shaft 12 functions as the capstan. A pinch roller 14 is in abutting engagement with the capstan 12 and a tape 15 is caused to run between the capstan 12 and the pinch roller 14. The running direction of the tape 15 is changed by rotating the motor 10 forwardly or reversely and the running speed of the tape 15 is changed by changing the rotation speed of the motor 10. In this embodiment, description will be made on the assumption that the capstan motor 10 is made by a brushless motor.

An FG (frequency generator) 16 is provided for the rotation speed detection of the capstan motor 10. The FG 16 generates a pulse signal at a period determined by equally dividing one revolution of the motor 10. The period of this pulse signal constitutes speed detection information. This pulse signal does not contain rotation direction detection information.

The output pulse of the FG 16 is applied from an input terminal 19 to the motor driving signal output circuit 18, and is wave-shaped by a Schmidt circuit 20 and then applied to a PWM signal generation circuit 22.

A mode control circuit 24 produces a direction command CRW ordering forward rotation or reverse rotation of the motor 10 and time information T1, T2 constituting a rotation speed command in accordance with operation modes such as normal speed playback and double speed playback. The direction command CRW becomes "H" when reverse direction is ordered and "L" when forward rotation is ordered. The direction command CRW is directed to an output terminal 21 and the time information T1, T2 is applied to the PWM signal generation circuit 22.

The PWM signal generation circuit 22 compares the speed of the motor 10 detected from the FG output pulse with the speed command for the motor 10 provided by the time information T1, T2 generated by the mode control circuit 24 and thereupon produces an error signal of a 8 bits, divides it into two bit groups of higher order 4 bits and lower order 4 bits and produces PWM signals CFH' and CFL' whose duty ratio changes in accordance with values of the respective bit groups.

By dividing the error signal into two bit groups as described above, the period of the PWM signals can be shortened to $\frac{1}{2}^4 = 1/16$ of a PWM signal produced from an undivided error signal while reference clock of the same period is used. These PWM signals CFH' and CFL' are directed to output terminals 30 and 32 and used for driving the motor 10. When the PWM signal is applied to the motor 10, the motor 10 is driven by an average level of the PWM signal so that its rotation speed increases as the duty ratio of the PWM signal increases.

A motor rotation enable signal CAFCE becomes "H" when motor rotation is enabled and "L" when it is disabled and is provided from an output terminal 38.

A specific example of the PWM signal generation circuit 22 is shown in FIG. 2. A control circuit 40 receives the time information T1, T2 as the speed command from the mode control circuit 24 and the FG output pulse as a timing signal for starting counting of the time T1 and produces a clock signal. A counter 42 is counted up by this clock signal and cleared each time the FG output pulse is provided. The time information T1, T2 and the period of the clock signal are determined at such values that the count of the counter 42 immediately before being cleared becomes a predetermined count when the period of the FG output pulse is a regular period and, accordingly, the speed error is known by the count value immediately before being cleared.

The counter 42 consists of 8 bits and is capable of counting 256 times from 0 to 255. Upon reaching of the count to 255, the count stops at 255 even if the clock signal is applied further.

PWM circuits 44 and 46 receive respectively 4 higher order bits and 4 lower order bits of the count (8 bits) of the counter 42 immediately before being cleared and outputs PWM signals CFH and CFL having duty ratios corresponding to the respective values.

The speed error detection operation by the counter 42 is explained with reference to FIG. 3. Upon lapse of time T1 after resetting of the counter 42 by the FG output pulse, counting up is started by a clock signal of a predetermined period and the counter 42 is cleared by rising of next FG output pulse. In the counter 42, count 128 which is half of the maximum count is set as reference value and length of time from starting of counting to reaching count 128 is given as the time T2. T1+T2 constitutes reference period of the FG output. Accordingly, when the period of the FG output coincides with this reference period (i.e., when there is no speed error), the counter 42 is cleared at count 128. If the detected speed is higher than the regular speed, the period of the FG output pulse is shortened so that the counter 42 is cleared at a smaller count than 128 whereas if the detected speed is lower than the regular speed, the period of the FG output is prolonged so that the counter 42 is cleared at a larger count than count 128. Accordingly, the speed error can be detected by the count of the counter 42 immediately before the counter 42 is cleared.

Since the speed of the capstan motor 10 must be changed depending upon the operation mode, the reference period T1+T2 is adjusted depending upon the operation mode. An example of setting of the reference frequency of the FG output, the reference period T1+T2 and time T1, T2 in respective operation modes is shown in the following Table 1:

TABLE 1

| Operation mode | Reference frequency (Hz) of FG output | Reference period T1 + T2 (mS) of FG output | T1(mS) | T2(mS) |
|---|---|---|---|---|
| Recording & playback (0.5TP) | 200 | 5.00 | 3.26 | 1.74 |
| Recording & playback (1 TP) | 400 | 2.50 | 2.06 | 0.44 |
| Playback (1.5TP) | 600 | 1.67 | 1.45 | 0.22 |

TABLE 1-continued

| Operation mode | Reference frequency (Hz) of FG output | Reference period T1 + T2 (mS) of FG output | T1(mS) | T2(mS) |
|---|---|---|---|---|
| 4.5 multiple speed playback (0.5TP) | 900 | 1.11 | 1.00 | 0.109 |
| same (1 TP) | 1800 | 0.556 | 0.529 | 0.027 |
| same (1.5TP) | 2700 | 0.370 | 0.357 | 0.013 |

Remarks
0.5TP: long time mode
1 TP: standard mode
1.5TFP: prerecorded tape mode (wide track)

In any mode, the period of the clock signal used for counting up is determined so that time from start of counting up till reaching count 128 becomes T2.

According to Table 1, the time T2 decreases as the reference time T1+T2 decreases (T1 and T2 are determined so that $(T1+T2)^2/T2$ becomes substantially constant). If the time T2 is made constant (i.e., if the period of the clock used for counting up is made constant), ratio of the speed error to the count varies so that the gain of the speed servo loop varies with resulting variation in the servo characteristics. By determining the values of times T1, T2 in accordance with the reference period T1+T2 so that $(T1+T2)^2/T2$ becomes substantially constant and determining the period of the clock signal used for counting up so that the count reaches the reference count 128 at the time T2, constant servo characteristics can be achieved in each operation mode.

Figure 4:
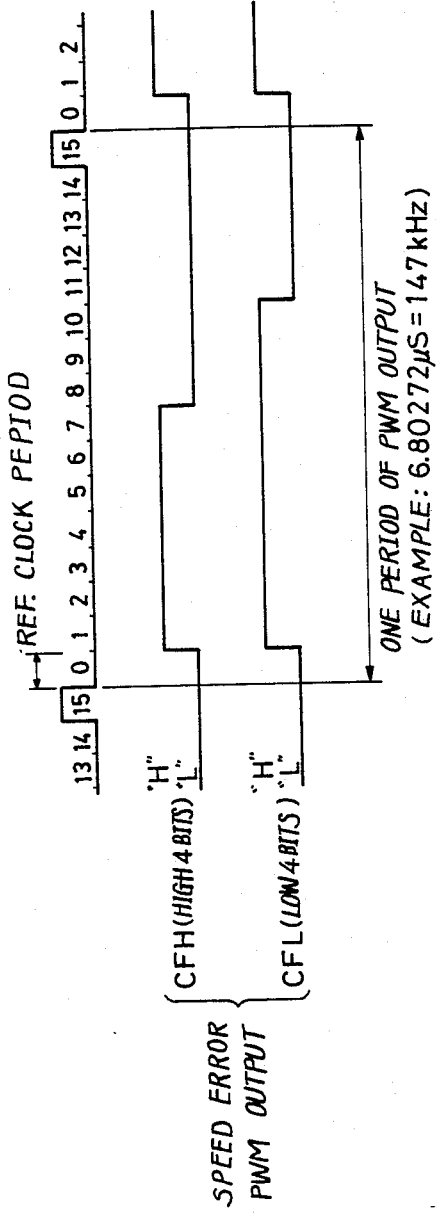
FIG. 4 is a diagram showing an example of output PWM signals of PWM circuits 44 and 46 in FIG. 2.

The operations of the PWM circuits 44 and 46 of FIG. 2 generating the PWM signals in accordance with the speed error detected by the counter 42 in the foregoing manner will now be described with reference to FIG. 4. As described above, the PWM circuits 44 and 46 generate the PWM signals from the higher order 4 bits and the lower order 4 bits derived by dividing the 8 bit output of the counter 42. These PWM signals are provided as signals obtained by dividing one period of the PWM signal (e.g., 6.80272μ sec in case the frequency of the PWM signal is 147 KHz) by 16 which is a numerical value which can be expressed with 4 bits and maintaining "H" state during periods of time corresponding to numerical values of the higher order 4 bits and lower order 4 bits of the counter 42. In the example of FIG. 4, for example, PWM signals when the count of the higher order 4 bits is 7 and the count of the lower order 4 bits is 10 are shown. This corresponds to 7×16+10=122 counts as the count of the counter 42 and, in this case, the detected period is shorter than the count 128 (the higher order 4 bits are 8 and the lower order 4 bits are 0) which is the reference period, i.e., the detected speed is higher than the regular speed.

By the above described arrangement, the PWM signals CFH′ and CFL′ having duty ratio corresponding to the count of the counter 42 (i.e., the speed of the motor 10) are obtained. The PWM signals CFH′ and CFL′ are repeatedly produced with the same duty ratio until the counter 42 is renewed by generation of next FG output pulse.

By dividing the 8 bit output of the counter 42 into the higher order 4 bits and the lower order 4 bits to produce the PWM signals, the period of the PWM signal can be shortened and accuracy of an error signal thereby can be improved. If the PWM signal was not divided into the higher order bits and the lower order bits, the PWM signal provided would be a signal obtained by dividing the period of the PWM signal by 256 which corresponds to maximum numerical value that can be expressed with 8 bits and maintaining the state "H" during a period of time corresponding to the numerical value expressed by the 8 bit output of the counter 42. If the length of one divided section (i.e., reference clock period) is the same, the PWM signal which is not divided into the higher order bits and the lower order bits has a period which is 256/16=16 times as long as the period of the PWM signal which is divided into the higher order bits and the lower order bits (it is sufficient if the period is divided by 16). If the period is longer, accuracy of the error signal is adversely affected to that extent. This is why the output of the counter 42 is divided into the higher order bits and the lower order bits to produce the PWM signal.

Since the higher order 4 bits have weight which is 16 times as large as the lower order 4 bits, weight which is 16 times as large as that of the PWM signal CFL is given to the PWM signal CFH as will be described later when the motor 10 is driven by the PWM signals CFH and CFL.

Figure 5:
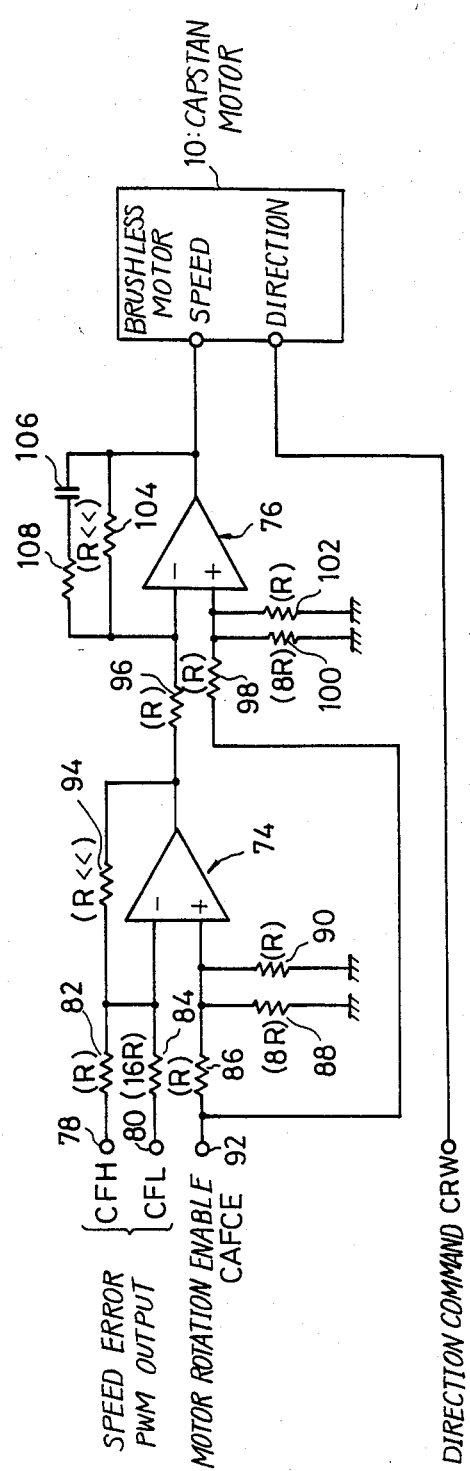
FIG. 5 is a diagram showing an example of a circuit for driving a capstan motor constructed of a brush motor by using the drive circuit shown in FIG. 1.

FIG. 5 shows an example of a servo circuit used for driving the capstan motor 10 constructed of a brushless motor by the output of the circuit of FIG. 1. In this circuit, two amplifiers 74 and 76 are connected in series.

The amplifier 74 is an adding amplifer. The PWM signals CFH and CFL are applied to input terminals 78 and 80 and added together after being weighted at a ratio of 16:1 by resistances 82 and 84. The sum signal is applied to the inverting input terminal of the adding amplifier 74. The motor rotation enable signal CAFCE is applied from an input terminal 92 and a voltage obtained by voltage-dividing it with resistance 86 and parallel resistances 88 and 90 is applied to the non-inverting input terminal of the adding amplifier 74 as a reference voltage. The gain of the adding amplifier 74 is set at a relatively large value by resistance 94.

The output of the adding amplifier 74 is applied to an inverting input terminal of the amplifier 76. To the non-inverting input terminal of the amplifier 76 is applied, as a reference voltage, a voltage obtained by voltage-dividing the motor rotation enable signal CAFCE with resistance 98 and parallel resistances 100 and 102. The gain of the amplifier 76 is set at a relatively large value by resistance 104. Capacitor 106 and resistance 108 are provided for phase-compensation in the high frequency region. The motor 10 is controlled in its speed by the output of the amplifier 76 and also controlled in its rotation direction by the direction command CRW.

In the above described embodiment, binary information for generating a PWM wave is divided into two bit groups and the PWM signals CFH and CFL are produced on the basis of the two bit groups. The binary information may be divided into more bit groups to produce more PWM signals. In such case also, these PWM signals may be weighted in an analog manner at a ratio corresponding to orders of the respective bit groups and added together.

In the above described embodiment, this invention is applied to the motor control of an R-DAT. The invention may however be applied to devices other than R-DAT and for purposes other than motor control.

What is claimed is:

1. A PWM circuit for generating a PWM wave which is pulse-width modulated in response to binary information comprising:
   means for dividing said binary information provided for generating a PWM wave into plural bit groups of different orders and generating PWM waves corresponding to numerical values of these plural bit groups; and
   means for weighting the generated PWM waves in an analog manner at a ratio corresponding to the orders of the respective bit groups and adding the weighted PWM waves.

2. A motor speed error detection circuit comprising:
   speed error signal generation means for counting a pulse sequence of a predetermined frequency within a predetermined time interval of a frequency generator output pulse generated in accordance with rotation of a motor and generating a binary speed error signal in accordance with counting of the pulse sequence;
   means for dividing the speed error signal into plural bit groups of different orders and generating PWM waves corresponding to numerical values of these plural bit groups; and
   means for weighting the generated PWM waves in an analog manner at a ratio corresponding to the orders of the respective bit groups and adding the weighted PWM waves.

3. A PWM circuit according to claim 1 wherein each bit group has an equal number of bits.

4. A PWM circuit according to claim 2 wherein each bit group has an equal number of bits.

5. A motor control system comprising:
   a motor;
   a speed error detector for generating a binary speed error signal on a periodic basis representative of an error in the rotation speed of the motor relative to a desired speed;
   means for dividing the speed error signal into plural bit groups of different orders and generating plural PWM waves corresponding to the values of the bit groups; and
   means for combining the PWM waves at a ratio corresponding to the orders of the respective bit groups to produce a drive signal to the motor, whereby delay between generation of each speed error signal and a corresponding drive signal is minimized.

* * * * *